May 5, 1964  H. E. BRYANT  3,131,456
SAFETY CONTROL FOR A CHUCKING MACHINE
Original Filed March 14, 1960
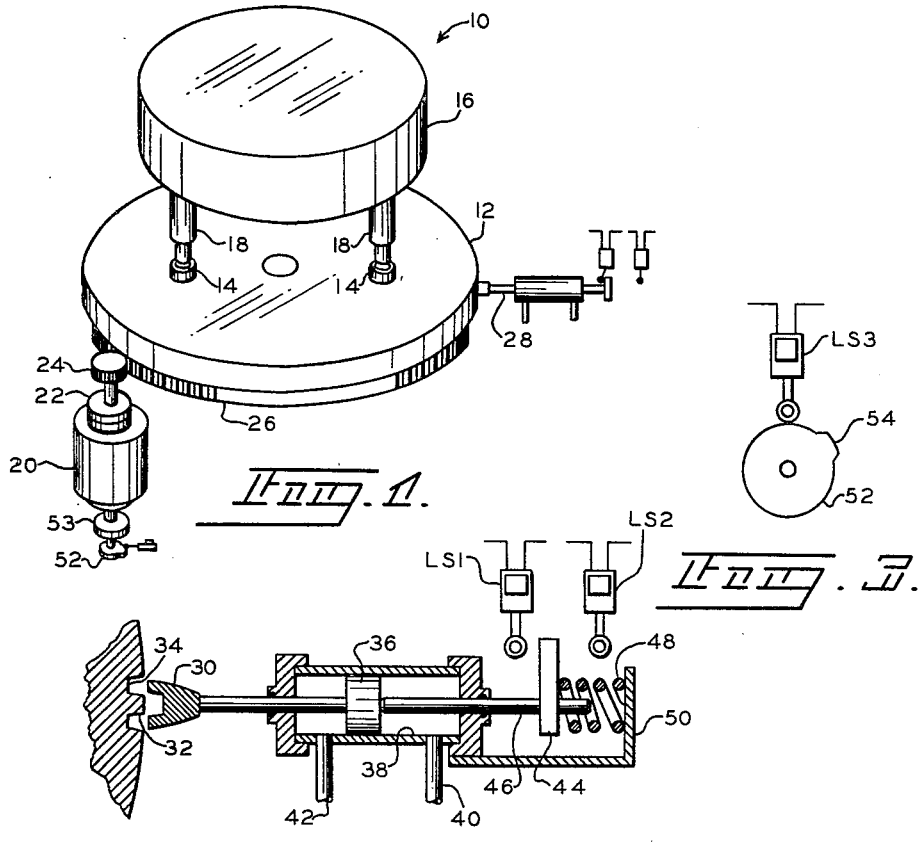
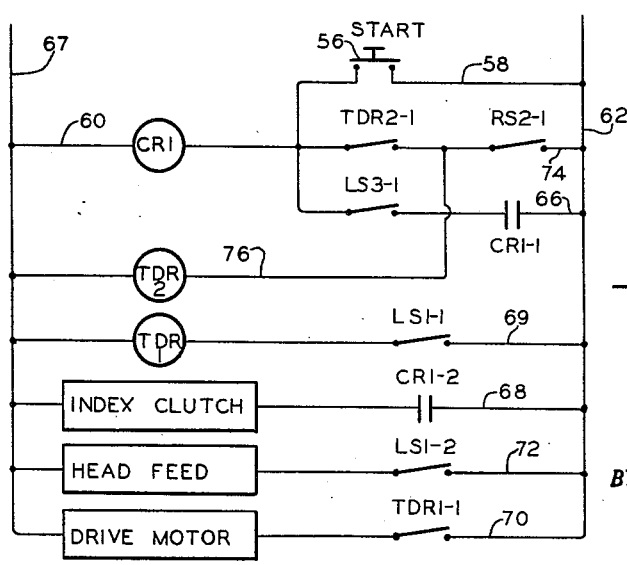
INVENTOR.
HENRY E. BRYANT
BY Owen & Owen United States Patent Office 3,131,456
Patented May 5, 1964

3,131,456
SAFETY CONTROL FOR A CHUCKING MACHINE
Henry E. Bryant, 839 Rogers St., Toledo, Ohio
Continuation of application Ser. No. 14,959, Mar. 14, 1960. This application Mar. 30, 1960, Ser. No. 18,565
4 Claims. (Cl. 29—38)

This invention relates to a safety control system for an automatic chucking machine.

In a typical chucking machine, several work-holding stations are located on a table which is periodically indexed to move workpieces from one work station to the next. Sequential operations are thereby performed on the workpieces as they move from tool to tool.

It is essential that positive controls be employed with such machines to prevent accidental, premature or inaccurate indexing. Thus, if the table is indexed prematurely, before the locking pins which hold the table in fixed positions are released, considerable damage can result to the tools, the tool heads, the chucks, the workpieces, the locking pins, and the drive mechanism which can amount to thousands of dollars, and result in a considerable loss of production time. Similarly, substantial damage can result if the tools are fed toward the work before indexing is completed or if the indexing is inaccurate and the workpieces are not in alignment with the tools.

While safety controls are employed with such machines to prevent the above-mentioned mishaps, nevertheless, in many instances the controls are not completely dependable and occasionally these mishaps do occur. Even though the malfunctioning is rare, damage resulting therefrom is sufficiently great to require perfection in the control system.

The present invention relates to an improved safety control system for chucking machines which system is more reliable and assures indexing only at the proper time as well as prevents the tools from feeding toward the work unless the work is accurately positioned.

It is, therefore, a principal object of the invention to provide a more reliable safety control system for chucking machines to prevent improper and premature indexing and improper feeding of the tools toward the workpieces.

Other objects and advantages of the invention will be apparent from the following detailed description of a preferred embodiment thereof, reference being made to the accompanying drawing, in which:

FIG. 1 is a schematic view in perspective of a two-station chucking machine and a portion of the new safety control system for use therewith;

FIG. 2 is a schematic view in cross section of a portion of the controls shown in FIG. 1;

FIG. 3 is a bottom view of a component of the controls shown in FIG. 1; and

FIG. 4 is a diagrammatic representation of a control circuit embodying the principles of the invention.

Referring to the drawing, and more particularly to FIG. 1, a typical chucking machine embodying a control system according to the invention is indicated by the numeral 10 and includes a rotatable work table 12 having two work-holding means or chucks 14 which rotate the work and which provide two work stations for the table 12. A tool unit or feed means 16 is located above the table 12 and includes two tool heads 18, one for each work station, which drive the tools held thereby toward and away from work clamped in the chucks 14. While the chucking machine 10 includes only two work stations for clarity of illustration, it is to be understood that the machine can employ many more work stations, most chucking machines commonly employing six to sixteen stations, including a loading and unloading station. The control system according to the invention has been specifically designed for a Bullard Model L vertical chucking machine as set forth in a booklet entitled "Bullard Mult-Au-Matic Vertical Chucking Machines, Type 'L,' Operators Instruction Book" and designated "MAMO–L1–4–56 3M5C." It is to be understood, however, that it is within the province of one skilled in the art to adapt the system to other machines.

The table 12 is rotated by any suitable means which includes a drive motor and a clutch and is represented in the drawings as a drive motor 20, an electric clutch 22, and a pinion gear 24 in engagement with a ring gear 26, which is suitably attached to the table 12. When the table is driven by the motor 20 to the next station, in this case in a 180° arc, the clutch 22 is disengaged and a lock pin 28 locks the table 12 in position. For this purpose, a cup or engaging means 30 (see FIG. 2) is carried at the end of the lock pin 28 to engage a projection or cooperating means 32 carried by the table 12, there being one of the projections 32 for each work station. The projection 32 is located in a recess 34 and is designed so that the cup 30 cannot extend inwardly beyond the periphery of the table 12 unless the cup is substantially aligned with the projection 32 so as to fit therearound and extend into the recess 34. When the cup 30 is in the inner position, it corrects any slight misalignment of the table 12 and holds the table firmly in position while the tools carried by the tool heads 18 operate on the work carried by the chucks 14.

The lock pin 28 has a piston 36 located in a cylinder 38 which is supplied with hydraulic fluid through a line 40 or 42 to drive the piston 36, the lock pin 28, and the cup 30 toward or away from the table 12. The controls for supplying hydraulic fluid through the lines 40 and 42 to the cylinder 38 are part of the above-described machine and are not part of the present invention; hence, they are not illustrated here. It will be understood that other means can be employed to move the lock pin 28.

A trip tab 44 is carried by a lock pin rod 46 which extends through the rear of the cylinder 38 and moves in response to the movement of the piston 36 and the lock pin 28, the rod 46 being urged toward the piston 36 by a spring 48 held in compression between the tab 44 and a bracket 50. A limit switch LS1 is located on one side of the tab 44 and is contacted by the tab when the locking pin 28 is in its inner position. A limit switch LS2 is located on the other side of the tab 44 and is contacted by the tab when the locking pin 28 is in its outer position. The limit switches LS1 and LS2 prevent improper indexing and operation of the tool heads 18, as will fully appear subsequently.

When the table 12 is indexed to a new position and the locking pin 28 is extended inwardly and causes the cup 30 to engage the projection 32, the tool heads 18 are fed downwardly by suitable mechanism in the unit 16. When the operation is complete and the table 12 is to be indexed again, a cam 52, through suitable means represented in this instance by a high speed gear train 53, is immediately rotated causing a raised portion 54 to contact and open a limit switch LS3 before the table 12 moves. The limit switch LS3 thereby prevents premature indexing, as will be more apparent subsequently.

FIG. 4 shows an electrical circuit of the safety control system, which circuit embodies the components discussed above. Besides the three limit switches, there are two time delay relays, a control relay, and a start switch 56. The switch 56 in a line 58 is pushed to initiate operation of the table 12 and also starts the hydraulic pumps of the machine 10 through remaining, standard portions of the circuitry. When the switch 56 is closed, it completes a circuit through the line 58 and a line 60 containing a control relay CR1 which is actuated by power supplied through mainleads 62 and 64. When the control relay is actuated, it closes normally-open contacts CR1–1 in a line 66 and also closes normally-open contacts CR1–2 in a line 68 which thereby completes a circuit through the index clutch and mechanically connects the motor 20 to the drive mechanism 24 and 26. If the lock pin 28 is in its outer position, the limit switch LS1 will be out of contact with the tab 44 which places contacts LS1–1 in a closed position and enables a time delay relay TDR1 in a line 69 to begin timing out. This relay maintains operation of the drive motor through its normally closed contacts TDR1–1 in a line 70. The time delay relay TDR1 holds the contacts TDR1–1 closed as long as the contacts LS1–1 are open with the lock pin 28 in. The contacts TDR1–1 remain closed also when the contacts LS1–1 are closed until the relay TDR1 has timed out. When the pin 28 moves to its outer position, contacts LS1–1 close and the time delay relay TDR1 begins to time out for a period of approximately 6–8 seconds, whatever is long enough for the indexing operations to be completed. When the indexing is finished and the lock pin 28 moves in, contacts LS1–1 are again opened which keep the contacts TDR1–1 closed and the motor running. Thus, the drive motor continues to run unless a mishap occurs and the lock pin 28 fails to move to its inner position. In that case, the relay TDR1 times out and shuts off the drive motor.

When the table 12 is indexed to a new position, the index clutch is disengaged by standard controls of the machine and the locking pin 28 is forced inwardly to cause the cup 30 to engage the projection 32. With the locking pin thus in its inner position, the limit switch LS1 is engaged by the tab 44, causing its contacts LS1–1 to open to hold in the time delay relay TDR1. With the locking pin 28 in, a second set of contacts LS1–2 of the limit switch LS1 are also closed which completes a circuit through a line 72 to cause the head feed to operate and move the tool heads 18 and their tools toward the workpieces. With the operation completed and indexing again begins, the raised portions 54 of the cam 52, being synchronized with the indexing operation, strikes the limit switch LS3, causing it to temporarily open its contacts LS3–1 in the line 66 and drop out the control relay CR1, thus preventing operation of the clutch 22, even though the standard controls have readied the index clutch for operation. The control relay CR1 thus remains inactive until it is operated through a line 74 when contacts LS2–1 therein are closed, which can only occur when the locking pin 28 is in its outer position and the tab 44 contacts the limit switch LS2. Contacts LS1–1 of the limit switch LS1 are also then closed, thereby causing the time delay relay TDR1 to time out. Contacts LS1–2 open at the same time to prevent operation of the head feed. The contacts LS2–1 operate a time delay relay TDR2 in a line 76. This relay, after approximately a two second delay, closes contacts TDR2–1 and completes a circuit through the control relay CR1 which closes its contacts CR1–2 and engages the index clutch. The time delay relay TDR2 delays operation of the index clutch to assure complete disengagement of the chucks 14 from the chuck-driving mechanism before the table 12 is indexed. After this delay, the contacts TDR2–1 are closed, the control relay CR1 is pulled in, and the indexing cycle is again started.

This is a continuation of my copending application Serial No. 14,959, filed March 14, 1960, and now abandoned.

Various modifications of the above described embodiment of the invention will be apparent to those skilled in the art and it is to be understood that such modifications can be made without departing from the scope of the invention, if within the scope and spirit of the appended claims.

I claim:
1. In combination with a chucking machine comprising a rotatable work holding table, means for rotating and indexing the table, the means including a drive motor, an electrically operated index clutch operatively connecting the motor to the table, a circuit for energizing the index clutch, a circuit for energizing the motor, a locking pin movable between inner and outer positions, and effective when in the inner position, but ineffective when in the outer position, to prevent rotation of the table, a plurality of tools, feed means, a circuit for energizing the feed means, the feed means being inoperable when the circuit is open, and operable when the circuit is closed to advance the tools to perform an operation on work carried by the table and to withdraw the tools after performance of the operation, a cam, and means effective to rotate the cam before each rotation and indexing of the table, the improvement of a control circuit comprising a first time delay relay, first circuit means for energizing said first time delay relay, first contacts in said first circuit means, second contacts in the circuit for energizing the feed means, a second time delay relay, second circuit means for energizing said second time delay relay, third contacts in said second circuit means, fourth contacts in the circuit for energizing the motor, said fourth contacts being normally closed, but opened when said first time delay relay has timed out, and maintained open so long as said relay is energized, a control relay, circuit means for energizing said control relay, said circuit means including first normally open contacts which are closed when said control relay is energized, and normally closed contacts in series with said normally open contacts, and said circuit means also including, a parallel leg including second normally open contacts and said third contacts, said second normally open contacts being closed when said second time delay relay is energized, but only after timing out thereof, said circuit being effective to energize said control relay both when said first normally open contacts and said normally closed contacts are closed and also when said second normally open contacts and said third contacts are closed, normally open contacts in the circuit for energizing the index clutch which are closed when said control relay is energized, limit switch means responsive to the position of the locking pin and effective when the pin is in its inner position to open said first and third contacts while closing said second, and effective when the pin is in its outer position to close said first and third contacts while opening said second, and limit switch means operatively associated with the cam of the chucking machine and effective to open said normally closed contacts momentarily upon rotation of the cam.

2. In combination with a chucking machine comprising a rotatable work holding table, means for rotating and indexing the table, the means including a drive motor, an electrically operated index clutch operatively connecting the motor to the table, a circuit for energizing the index clutch, a circuit for energizing the motor, a locking pin movable between inner and outer positions, and effective when in the inner position, but ineffective when in the outer position, to prevent rotation of the table, a plurality of tools, feed means, a circuit for energizing the feed means, the feed means being inoperable when the circuit is open, and operable when the circuit is closed to advance the tools to perform an operation on work carried by the table and to withdraw the tools after performance of the operation, a cam, and means effective to rotate the cam before each rotation and indexing of the table, the improvement of a control circuit comprising a first time delay relay, first circuit means for energizing said first time delay relay, first contacts in said first circuit means, second contacts in the circuit for energizing the feed means, a second time delay relay, second circuit means for energizing said second time delay relay, third contacts in said second circuit means, fourth contacts in the circuit for energizing the motor, said fourth contacts being normally closed, but opened when said first time delay relay has timed out, and maintained open so long as said relay is energized, a control relay, circuit means for energizing said control relay, said circuit means including first normally open contacts which are closed when said control relay is energized, and normally closed contacts in series with said normally open contacts, said circuit being effective to energize said control relay when both said first normally open contacts and said normally closed contacts are closed, normally open contacts in the circuit for energizing the index clutch which are closed when said control relay is energized, limit switch means responsive to the position of the locking pin and effective when the pin is in its inner position to open said first and third contacts while closing said second, and effective when the pin is in its outer position to close said first and third contacts while opening said second, and limit switch means operatively associated with the cam of the chucking machine and effective to open said normally closed contacts momentarily upon rotation of the cam.

3. In combination with a chucking machine comprising a rotatable work holding table, means for rotating and indexing the table, the means including a drive motor, an electrically operated index clutch operatively connecting the motor to the table, a circuit for energizing the index clutch, a circuit for energizing the motor, a locking pin movable between inner and outer positions, and effective when in the inner position, but ineffective when in the outer position, to prevent rotation of the table, a plurality of tools, feed means, a circuit for energizing the feed means, the feed means being inoperable when the circuit is open, and operable when the circuit is closed to advance the tools to perform an operation on work carried by the table and to withdraw the tools after performance of the operation, a cam, and means effective to rotate the cam before each rotation and indexing of the table, the improvement of a control circuit comprising a time delay relay, first circuit means for energizing said time delay relay, first contacts in said first circuit means, second contacts in the circuit for energizing the motor, said second contacts being normally closed, but opened when said time delay relay has timed out, and maintained open so long as said relay is energized, and limit switch means responsive to the position of the locking pin and effective to open said first contacts when the pin is in its inner position and to close said contacts when the pin is in its outer position.

4. In combination with a chucking machine comprising a rotatable work holding table, means for rotating and indexing the table, the means including a drive motor, an electrically operated index clutch operatively connecting the motor to the table, a circuit for energizing the index clutch, a circuit for energizing the motor, a locking pin movable between inner and outer positions, and effective when in the inner position, but ineffective when in the outer position, to prevent rotation of the table, a plurality of tools, feed means, a circuit for energizing the feed means, the feed means being inoperable when the circuit is open, and operable when the circuit is closed to advance the tools to perform an operation on work carried by the table and to withdraw the tools after performance of the operation, a cam, and means effective to rotate the cam before each rotation and indexing of the table, the improvement of a control circuit comprising a first time delay relay, first circuit means for energizing said first time delay relay, first contacts in said first circuit means, second contacts in the circuit for energizing the feed means, a second time delay relay, second circuit means for energizing said second time delay relay, third contacts in said second circuit means, fourth contacts in the circuit for energizing the motor, said fourth contacts being normally closed, but opened when said first time delay relay has timed out, and maintained open so long as said relay is energized, a control relay, circuit means for energizing said control relay, said circuit means including second normally open contacts and said third contacts, said second normally open contacts being closed when said second time delay relay is energized, but only after timing out thereof, said circuit being effective to energize said control relay when both said second normally open contacts and said third contacts are closed, normally open contacts in the circuit for energizing the index clutch which are closed when said control relay is energized, limit switch means responsive to the position of the locking pin and effective when the pin is in its inner position to open said first and third contacts while closing said second, and effective when the pin is in its outer position to close said first and third contacts while opening said second, and limit switch means operatively associated with the cam of the chucking machine and effective to open said normally closed contacts momentarily upon rotation of the cam.

References Cited in the file of this patent

UNITED STATES PATENTS

| | | |
|---|---|---|
| 2,271,848 | Tcimpidis | Feb. 3, 1942 |
| 2,429,938 | Mansfield | Oct. 18, 1947 |
| 2,694,755 | Schuman | Apr. 7, 1951 |
| 2,845,639 | Jorgensen | Aug. 5, 1958 |